Sept. 25, 1928.  
C. DRAHN  
1,685,534  
APPARATUS FOR THE SEPARATION OF OIL FROM OIL CONTAINING SUBSTANCES  
Filed Feb. 4, 1927  3 Sheets-Sheet 3

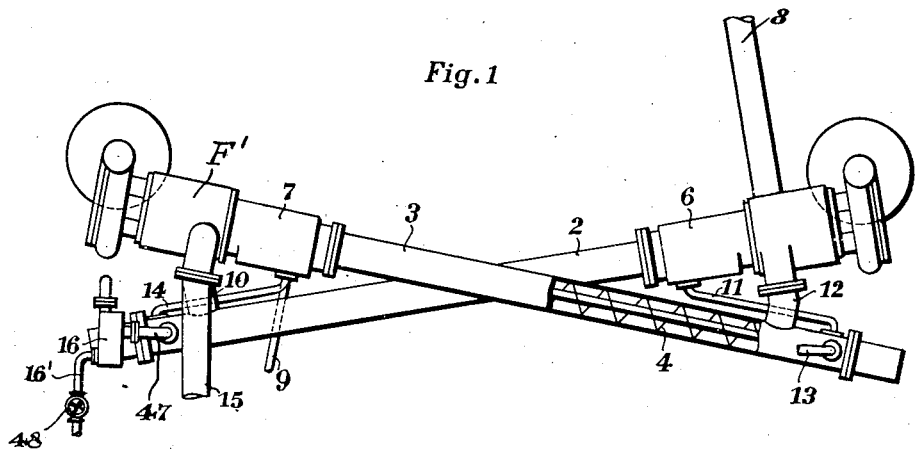
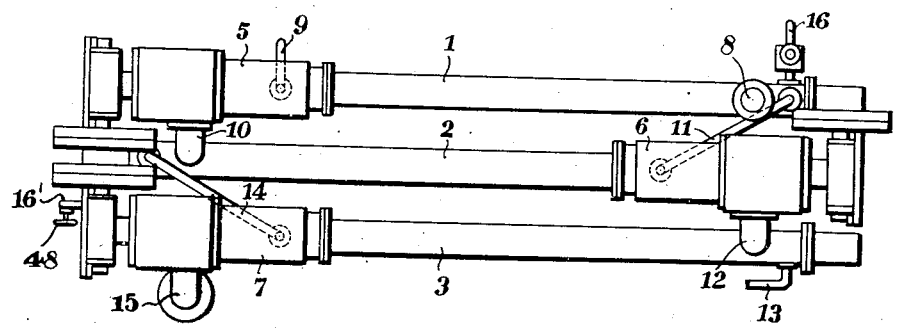

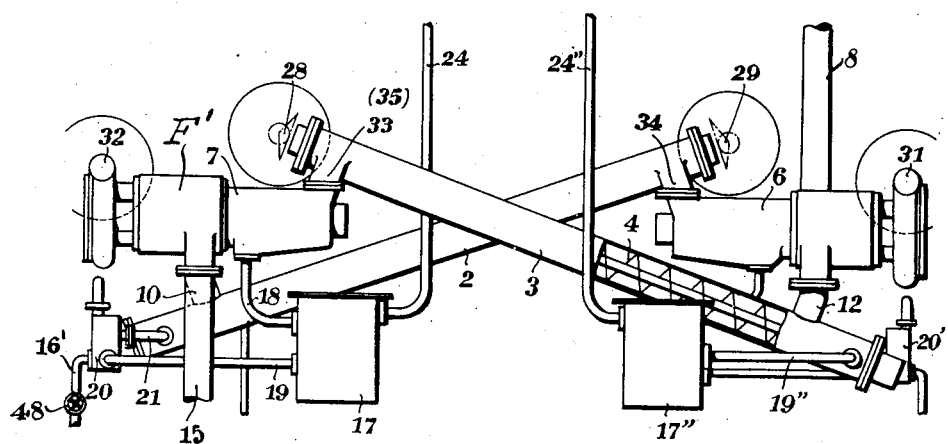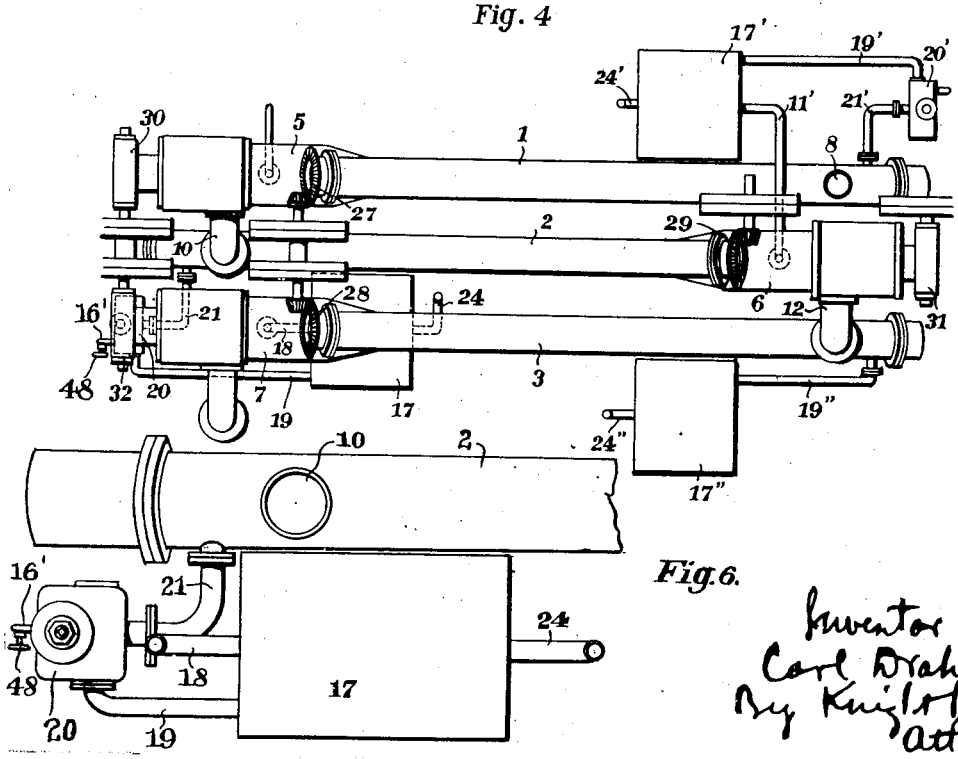

Inventor  
Carl Drahn  
By Knight Bro  
atty

Patented Sept. 25, 1928.

1,685,534

UNITED STATES PATENT OFFICE.

CARL DRAHN, OF MAGDEBURG, GERMANY, ASSIGNOR TO THE FIRM FRIED. KRUPP GRUSONWERK AKTIENGESELLSCHAFT, OF MAGDEBURG-BUCKAU, GERMANY.

APPARATUS FOR THE SEPARATION OF OIL FROM OIL-CONTAINING SUBSTANCES.

Application filed February 4, 1927, Serial No. 165,960, and in Germany December 9, 1925.

This invention relates to apparatus for the separation of oil from oil-containing substances said apparatus being of the kind in which the oil-containing substances passes in succession through several extraction chambers which for example may be mounted inclined and in which the said substance is repeatedly subjected to a pressing process during the treatment with the solvent. In apparatus of the type referred to according to the present invention the solvent is on the one hand caused to pass through each of the extraction chambers in the same direction as the oil-containing substance under treatment, and on the other hand the order of succession in which the solvent travels through the extraction chambers is opposite to that in which the said oil-bearing substance traverses the said chambers. The solvent medium, after passing through the last extraction chamber in the direction of travel of the oil-containing substance, is conducted together with the oil extracted in this extraction chamber to the bottom end of the extraction chamber previously traversed by the said oil-bearing substance and from the pressing chamber of this extraction chamber it is either passed in the same manner through one or more further extraction chambers or is passed direct to the oil separator. In the path traversed by the solvent there may be provided in the extraction chambers themselves, or in the liquid-containing pipes connecting them, overflow and liquid level control devices in order to permit a part of the mixture of oil and solvent to be drawn off should its flow into one container be more than is necessary for the treatment of the oil-containing substance. In order to render it possible, in the case of too small an influx of the mixture of oil and solvent, for the said mixture to be maintained at the amount requisite for the treatment of the oil-containing substance, not only the charging end of the last extraction chamber in the forward feed of the said substance is, as previously mentioned, connected to the pipe supplying the fresh solvent but the charging ends of the other extraction chambers can also independently communicate with this pipe from time to time (see Figs. 3 and 4). In the connecting pipe there is preferably inserted a controlling device which automatically secures the influx of fresh solvent into the extraction chambers as soon as the quantity of the inflowing mixture of oil and solvent falls below a predetermined minimum. This can be effected for example in such manner that at the bottom end of each extraction chamber there is provided for the solvent or mixture of oil and solvent supplied a reservoir connected with its respective extraction chamber, and in this reservoir there is provided a float to regulate the influx of the fresh solvent, for example, by means of lever transmission gearing.

In order that the said invention may be clearly understood and readily carried into effect, the same will now be described more fully with reference to the accompanying drawings, which illustrate diagrammatically several constructions of apparatus in accordance with the present invention with inclined extraction chambers, and in which:—

Figure 1 illustrates one form of apparatus in elevation and partly in section;

Figure 2 is a plan of the apparatus shown in Figure 1.

Figure 3 illustrates a constructional modification of the apparatus shown in elevation in Figure 1.

Figure 4 is a plan view of Figure 3.

Figure 5 illustrates a detail of the apparatus partly in section,

Figure 6 is a plan view of Figure 5,

Figure 7:
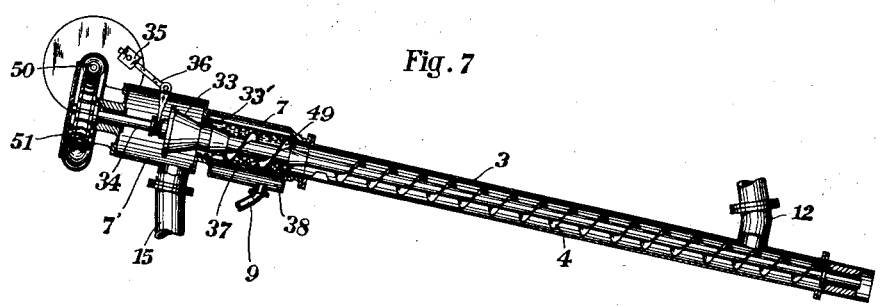
Fig. 7 is a vertical section of one of the extraction chambers and pressing devices.
Figure 8:
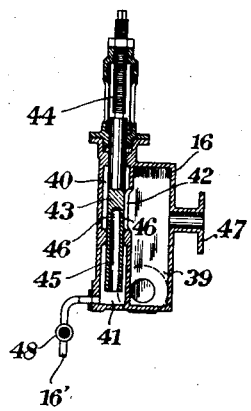
Fig. 8 is a vertical section of one of the discharge devices.

The oil extraction apparatus shown in Figures 1 and 2 comprises the inclined juxtaposed extraction chambers 1, 2 and 3. In each extraction chamber there is located at one end, hereinafter called the bottom end, a feed pipe (8, 10, 12) for the oil-containing substance to be treated, and at the other end there is a pressing chamber (5, 6, 7) to which the said substance is fed by means of a forward feed device, such for example as a worm 4. The pressing device may for example take the known form of a worm and a pressing cone projecting from the outside into the outlet aperture of the pressing chamber, which part of the pressing chamber is thus contracted so that the oil seed expressed passes out from an annular opening. Such a pressing device is shown in section in Fig. 7. Into the discharge end of the pressing chamber 7 projects a pressing cone 33 which is axially shiftable upon the shaft 34. The cone 33 is under the influence of a weight 35 mounted upon a bell-crank lever 36. One arm of the lever 36 engages the pressing cone 33 and the other bears the weight 35. Between the pressing cone 33 and the walls of the pressing chamber 7 there is an annular discharge gap 33' for the oil bearing material. The pressing space is gradually contracted toward the discharge gap by the pressing cone in order to cause a wringing of the material in the pressing space. If the pressure in the pressing chamber becomes too high, the pressing cone 33 moves outwardly raising the weight 35. In this way the discharge gap 33' is enlarged and more material can flow out of the pressing chamber, whereby the pressure therein is decreased and returned to normal. The pressing cone 33 then automatically returns to its normal position under the influence of the weight 35. There is therefore maintained in the pressing chamber a normal pressure independent of the quantity of material in the pressing chamber. The liquid pressed out of the material in the pressing chamber passes through a cylindrical sieve 37 into an annular space 38 surrounding the same and flows off through the pipe 9. The material in the pressing chamber is acted upn by the helical vanes 49. The shaft 34 is driven by a worm 50 and worm wheel 51. The cone 33 may also be adjusted by hand, for example, by moving the lever 36. In the bottom end of the extraction chamber 1 fresh oil bearing material is introduced through the pipe 8, and the pressing chamber 5 of this container is connected with an oil separator (not shown) by means of a liquid conduit 9. The oil separator, which forms no part of the present invention, may be of any conventional form. After passing through the pressing chamber 5, the material passes out at the top end of the extraction chamber 1 and through the pipe 10 into the extraction chamber 2 at the bottom end thereof. The pressing chamber 6 of the chamber 2 is connected by means of the liquid conduit 11 to the bottom end of the extraction chamber 1. From the top end of the extraction chamber 2 the oil bearing material passes through the pipe 12 into the extraction chamber 3 at the bottom end thereof. At this point the fresh solvent is also supplied through a pipe 13. The pressing chamber 7 of the extraction chamber 3 is in communication through the liquid conduit 14 with the bottom end of the extraction chamber 2, whilst the material from which the oil has been extracted is carried away through the pipe 15 connected to the top end of the chamber 3. At the bottom end of the extraction chambers 1, 2 a liquid overflow and liquid level control device 16 and 16' is provided in each case, which permits excess solvent to run off so that the level of the solvent does not rise above a certain height. Fig. 8 shows a vertical section of one of the discharge devices. The housing 16 is divided into chambers 39, 40, and 41. The chamber 39 is in connection with the chamber 40 through an opening 42. In the chambers 40 and 41 arranged one above the other is mounted a vertically movable slide valve 43, which bears at its upper end a spindle 44. By turning the spindle the slide valve 43 can be raised and lowered. At its lower end the slide valve 43 is provided with a longitudinal bore 45 into the upper end of which open transverse passages 46. The liquid entering the chamber 39 through the pipe 47 (Fig. 1) fills this chamber continually up to the level of the transverse passage 46 and then flows through the passage 46 and the bore 45 into the chamber 41, out of which it flows through a pipe 16' provided with a valve 48. By suitable adjustment of the slide valve 43 the height of the liquid level in chamber 39 can be adjusted and thereby the quantity of the liquid in the corresponding extraction chamber can be controlled at will.

The method of operation of the apparatus is as follows:—The preheated material, for example copra, peanuts, palm fruits, linseed, cottonseed, or the like, is admitted through the pipe 8 to the bottom end of the extraction chamber 1, and passes successively through the extraction chambers 1, 2 and 3. In the vicinity of its point of introduction into the chamber 3, that is to say at the bottom end of this chamber, the fresh solvent is introduced through the pipe 13. The fresh solvent hence comes into contact with the material, from which most of the oil has already been extracted, coming from the container 2, and is conveyed simultaneously with it, by means of the worm 4 for example, into the pressing chamber 7 of the chamber 3, all the residual oil being thereby extracted from it. Whilst the material, freed from oil and squeezed out through the pressing device 7, is carried away through the pipe 15 through which it drops by gravity, the mixture of oil and solvent separated out in the pressing chamber 7 of the chamber 3 is fed through the pipe 14 to the bottom end of the chamber 2, where it comes in contact with the partly extracted material coming from the chamber 1 and supplied through the pipe 10, and is then conveyed together therewith into the pressing chamber 6 of the chamber 2. The liquid separated off passes through the pipe 11 to the bottom end of the chamber 1, and there comes in contact with the fresh oil seed, together with which it passes in one uniform stream through the chamber 1. From the pressing chamber 5 of this chamber 1 the mixture of oil and liquid is conducted to the oil separator (not shown) through the pipe 9.

The constructional form of the apparatus shown in Figures 3 and 4 differs from that shown in Figures 1 and 2 in that the worm 4 located in each of the chambers 1, 2 and 3, and the pressing devices mounted in the pressing chambers 5, 6 and 7, are not driven in common as shown in Figure 1, but separately, as this has been found to be preferable. Hence the worms 4 are driven by the pairs of wheels 27, 28, 29, and the pressing devices are driven by the worm gearing 30, 31, 32. The extraction chambers 1, 2 and 3, are connected by means of the pipes 33, 34, 35 to the corresponding pressing chambers 7, 6, 5. Furthermore, the bottom end of each extraction chamber is in communication with a device by means of which the influx of fresh solvent to the chamber can be effected automatically. In all other respects the method of operation of the apparatus is the same as that of the apparatus shown in Figures 1 and 2.

In Figures 5 and 6 there is shown on a larger scale the device for regulating automatically the flow of fresh solvent to one of the extraction chambers, say for example the central one. This device consists of the reservoirs 17, 17' and 17'', one of which is mounted adjacent the bottom end of each of the extraction chambers 1, 2 and 3, to which it is connected. Hereinafter there will merely be described the application of the device 17 to the extraction chamber 2, as the devices 17, 17' and 17'' are precisely the same. The mixture of oil and solvent coming from the pressing chamber 7 of the extraction chamber 3 (see Figures 3, 4, 5 and 6) passes through the pipe 18 into the reservoir 17 and passes out therefrom through the pipe 19 and thence through the overflow and liquid level control device 20 and connecting pipe 21 into the extraction chamber 2. The liquid levels in the collector 17 and in the extraction chamber 2 are of equal height. The levels are maintained at such a height as is requisite at any particular time for the treatment of the material. Into the liquid contained in the reservoir 17 there dips a float 36 provided with a guide rod 26, which, by means of a lever 22, is connected to the valve cone 23 of a fresh solvent supply pipe 24. If the level of the liquid falls, owing to too small a supply of the mixture of oil and solvent, below the level required for the treatment of the material then the float 36 also falls, and, by lifting the valve cone 23, opens the feed pipe 24 for the supply of fresh solvent, so that it can flow in. When the surface of the liquid in the collector 17 has attained its normal level, then the float 36 automatically closes the feed pipe 24. By a suitable adjustment of the float, for example by displacement upon the guide rod 26, the desired level of the liquid can be regulated. With the last extraction chamber 3 to which only fresh solvent is supplied the reservoir 17 can also be used with advantage. The connection of the reservoir 17' to the extraction chamber 1 is effected through the pipe 19', overflow and liquid level control device 20' and pipe union 21', whilst the supply of the mixture of oil and solvent to the collector 17' is effected through the pipe 11'. The reservoir 17'' is connected by means of the pipe 19'' directly to the extraction chamber 3.

The possibility of supplying fresh solvent medium to each extraction chamber separately has the further advantage that the entire apparatus can be quickly brought into operation.

By means of the discharge and overflow devices provided at the bottom end of the extraction chambers 1 and 2 a part of the mixture of oil and solvent can be allowed to run off in the event of the flow thereof into the extraction chambers being too great. The liquid thus run off passes directly to the oil separator (not shown).

Any desired number and arrangement of the extraction chambers may be employed; for example the extraction chambers can be arranged side by side in the forward feed direction of the material. The forward feed and pressing devices used in the extraction chambers, as also the drive for the forward feed device, may be of various types.

The collectors for the extraction chambers 1 and 2 may also be connected direct to the corresponding extraction chamber.

What I claim is:

1. In apparatus for extracting oil from oil-bearing material, a series of interconnected extraction chambers each adapted to contain a quantity of solvent, means for charging oil-bearing material into the first of said series of chambers, means for conveying the oil-bearing material through said chambers in succession, whereby some of the solvent in each chamber is carried along with the oil-bearing material to the discharging end of the chamber, pressure means at the discharging end of each chamber adapted to press the solution of oil in solvent from the oil-bearing material, means for conveying said solution from each of said pressure means except the one associated with said first extraction chamber to the end of the preceding extraction chamber into which the oil-bearing material is charged, means for supplying fresh solvent to the charging end of the last of said series of containers, and means for leading off the oil solution from the pressure device of said first chamber.

2. Apparatus according to claim 1 in combination with means for introducing fresh solvent into the charging end of each chamber.

3. Apparatus according to claim 1 in combination with means for introducing fresh solvent into the charging end of each chamber, and a control device for said last mentioned means adapted to regulate the supply of fresh solvent in dependence upon the level of the solvent in the appurtenant chamber.

4. Apparatus according to claim 1 in combination with a reservoir communicating with the charging end of each extraction chamber into each of which except the one associated with the last extraction chamber the oil solution from the pressure device of the succeeding extraction chamber is led, a fresh solvent supply pipe leading into each of said reservoirs, a valve in each of said last mentioned pipes, a float in each of said reservoirs, and connections between each float and valve whereby said valves are controlled in dependence on the level of the liquid in each reservoir.

5. Apparatus according to claim 1 in combination with overflow devices connected with the charging end of each extraction chamber and adapted to automatically maintain the solvent level of the appurtenant extraction chambers below a predetermined maximum.

6. Apparatus according to claim 1 in combination with overflow devices connected with the charging end of each extraction chamber and adapted to automatically maintain the solvent level of the appurtenant extraction chambers below a predetermined maximum, each of said overflow devices comprising a chamber divided into two communicating compartments by an adjustable weir, a connection between one of said compartments and the appurtenant extraction chamber, and a discharge pipe leading from the other compartment.

7. In apparatus for extracting oil from oil-bearing material, a series of extraction chambers each adapted to contain a quantity of solvent, means for charging oil-bearing material into the first extraction chamber, conveyors for the oil-bearing material in each extraction chamber, driving means for each of said conveyors, pressure means at the discharging end of each chamber adapted to press from the oil-bearing material the solvent carried along therewith together with the oil in solution, separate driving means for each of said pressure means, means for conveying the pressed oil-bearing material from each pressure means except that of the last extraction chamber to the charging end of the succeeding extraction chamber, means for conveying the oil-solvent solution from each pressure means except that of the first extraction chamber to the charging end of the preceding extraction chamber, means for supplying fresh solvent to the charging end of the last extraction chamber, and means for leading off oil-solvent solution from the pressure means of the first extraction chamber.

The foregoing specification signed at Berlin, Germany, this 17th day of January, 1927.

CARL DRAHN.